Nov. 23, 1954   C. J. WESTLING   2,695,155
PLATE VALVE

Filed June 7, 1951   3 Sheets-Sheet 1

INVENTOR
Carl J. Westling

Nov. 23, 1954

C. J. WESTLING 2,695,155

PLATE VALVE

Filed June 7, 1951

INVENTOR
Carl J. Westling

Nov. 23, 1954    C. J. WESTLING    2,695,155
PLATE VALVE

Filed June 7, 1951    3 Sheets-Sheet 3

INVENTOR
Carl J. Westling
by Hooper, Leonard & Glenn
his attorneys

United States Patent Office 2,695,155
Patented Nov. 23, 1954

2,695,155

PLATE VALVE

Carl J. Westling, West Orange, N. J., assignor to Vulcan Research Corporation, Pittsburgh, Pa., a corporation of Pennsylvania Application June 7, 1951, Serial No. 230,334

3 Claims. (Cl. 251—159)

This invention relates to plate valves. It relates especially to plate valves having a valve element movable transversely of a conduit between open and closed positions with a casing substantially segregating the inside of the conduit in the region of the valve from the outside. The invention has to do with improvements in the casing and its application to the valve structure.

Examples of valves to which my invention is applicable are plate valves employing a sliding or swinging plate or valve element movable between a position across a conduit in which it is adapted to prevent flow of fluid through the conduit and a position in which fluid flow through the conduit is permitted. The valve element may be an imperforate plate disposed across the conduit when operative and disposed in a position remote from the conduit when inoperative or a plate having an imperforate portion disposed across the conduit when the valve is closed and a perforate portion adapted to be aligned with the conduit when the valve is open, such a valve being commonly termed a goggle valve. In each case the valve construction normally comprises peripherally closed sealing members at opposite sides of the valve element. The sealing members are connected with the conduit and may be relatively movable toward and away from each other so that they may be relatively moved toward each other to seal against the valve element when the valve element is in closed position and to seal either against the valve element or against each other when the valve element is in open position, depending upon the particular type of valve element which is employed. When the sealing members are relatively movable toward and away from each other they may be relatively bodily displaceable as a whole toward and away from each other, either both of the sealing members being thus displaceable or one of them being stationary and the other displaceable relatively to the stationary sealing member.

Valves of the type above referred to are generally of large size, being normally used in conduits having a diameter of several feet. A conduit with which such a valve is used may be employed for transmitting gases which may be partially or wholly noxious and is thus important that substantial leakage in the region of the valve be inhibited.

It is very old in the art to provide casings about valves of various kinds, including plate valves, to inhibit leakage. However, the provisions which heretofore have been made have not been entirely satisfactory for most goggle valves; moreover, I have solved in an improved manner, specific problems arising in the sealing of these particular types of valves.

I provide a plate valve comprising a valve element movable transversely of a conduit between open and closed positions, sealing members at opposite sides of the valve element connected with the conduit and relatively bodily displaceable as a whole toward and away from each other and a casing enclosing the valve element, the casing being carried by the sealing members and sealed thereto and being effective for substantially segregating the inside of the conduit in the region of the valve from the outside. In such cases, i. e., when relatively bodily displaceable sealing members are employed and the casing is carried by the sealing members, the casing may be made flexible so as to deform or bend slightly upon relative displacement of the sealing members. The extent to which the casing is required to bend is not great as the relative movement between the sealing members is quite limited; in most cases it is only a small fraction of an inch. The casing may have opposed portions each of which generally surrounds part of one of the sealing members and is sealed thereto and a peripheral portion sealing the opposed portions to each other. The valve element in its movement transversely of the conduit between open and closed positions may be turnable generally in a plane transversely of the conduit.

The casing may have a body portion enclosing the valve element and sealed to the conduit, i. e., either to the conduit per se or, if relatively moveable or displaceable sealing members as above referred to are employed, to those sealing members. When a turnable valve element is employed I preferably provide means cooperating with the valve element at its periphery and at least partly disposed outside the body portion of the casing for turning the valve element and also an extension on the casing sealed to the body portion thereof and disposed generally about and sealed to a portion of the turning means so that the casing as a whole is effective for substantially segregating the inside of the conduit in the region of the valve from the outside. I may provide teeth on the edge of the valve element and toothed operating means meshing with the teeth on the edge of the valve element for turning the valve element. In such case the body portion of the casing preferably has an opening permitting meshing of the teeth on the edge of the valve element with the toothed operating means and the extension on the casing is sealed to the body portion thereof so as to close the opening and disposed generally about and sealed to a portion of the toothed operating means. The toothed operating means may include a shaft for driving the same which may pass through the casing extension. The shaft may have hub means thereon at opposite sides of the teeth of the toothed operating means and the casing extension may be sealed to the hub means.

When the sealing members at opposite sides of the valve element are relatively movable toward and away from each other I may provide operating means extending between the sealing members for relatively moving them toward and away from each other. The operating means may pass through the casing and may be sealed thereto. I may provide a sleeve closely embracing the operating means and the casing may be sealed to the conduit and to the sleeve.

Other details, objects and advantages of the invention will become apparent as the following description of a present preferred embodiment thereof proceeds.

In the accompanying drawings I have shown a present preferred embodiment of the invention in which Figure 1 is a cross-sectional view of a plate valve, the cross-section being taken at right angles to the conduit to which the valve is applied and being indicated by the line I—I of Figure 2;

Figure 1:
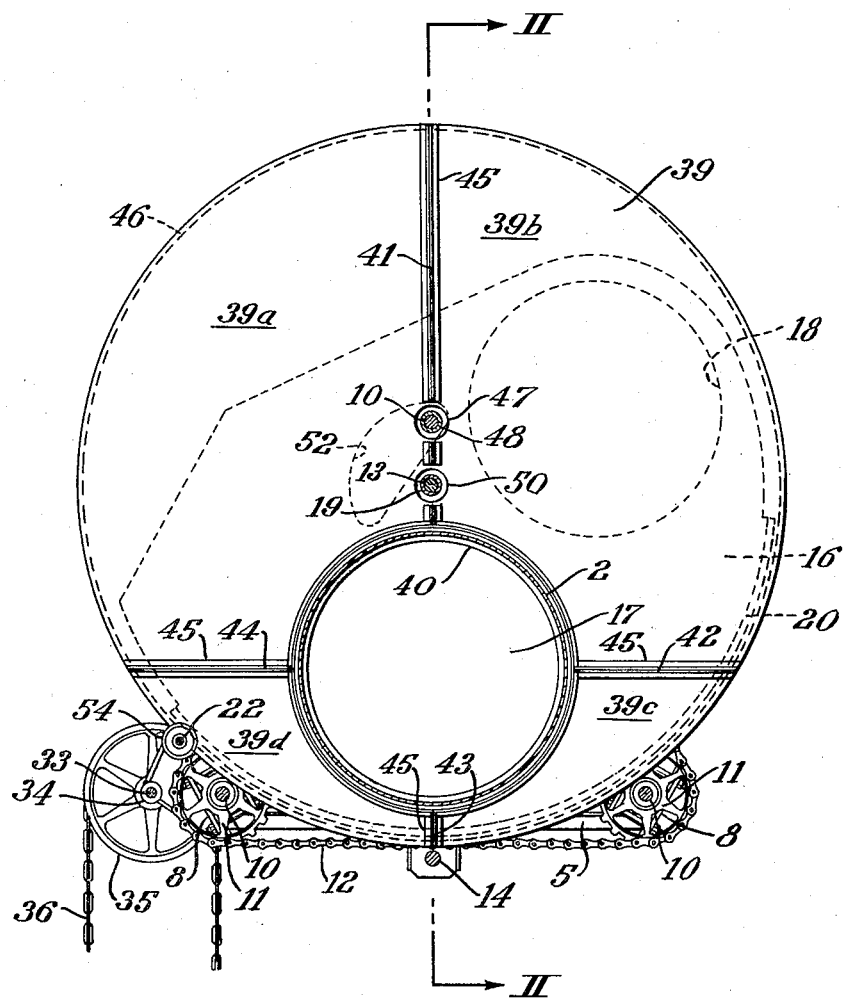

Referring now more particularly to the drawings, the valve shown is of the goggle type having a plate having a perforate portion adapted to be disposed across the conduit in which the valve is employed when the valve is in open position and an imperforate portion adapted to be disposed across the conduit when the valve is in closed position. The conduit per se is not shown in detail in the drawings because the invention relates entirely to the valve structure but is indicated fragmentarily at 1 and there are shown in the drawings sealing members 2 and 3 at opposite sides of the valve element and which are adapted to be connected with the conduit through flanges 4, the sealing members 2 and 3 being relatively bodily displaceable as a whole toward and away from each other. In the structure shown both of the sealing members 2 and 3 are bodily displaceable toward and away from each other. The means for displacing the sealing members 2 and 3 comprises opposed impelling members 5 which may be in the form of triangular frames disposed generally about the respective sealing members 2 and 3 and connected therewith through spaced projections or lugs 6 on the sealing members entering slots 7 in the impelling members at about the centers of the three sides thereof. At each of the three corners thereof the impelling members 5 have sleeves 8, there being three such sleeves on each of the impelling members. Each of the sleeves 8 embraces a nut 9. A shaft 10 having threaded ends engaging the nuts 9 embraced by the sleeves of the respective impelling members extends transversely of the structure at each of the three corners of the impelling members. At each corner the two nuts 9 are of the same hand but of different lead so that turning of the shaft 10 whose threaded portions mesh with the threads of the nuts moves the nuts in the same direction but at different speeds and consequently, depending upon the direction of turning of the shaft 10, the nuts while traveling in the same direction move either relatively toward or relatively away from each other.

Each of the three shafts 10 has keyed thereto a sprocket 11. A sprocket chain 12 meshes with the three sprockets 11 so that upon turning of one of the shafts 10 all three of the shafts partake of simultaneous turning movement in the same direction and at the same speed. This moves the impelling members 5 either relatively toward or relatively away from each other depending upon the direction of turning of the shafts 10. In turn the impelling members move the sealing members 2 and 3 toward and away from each other; indeed, in the form shown the sealing members are by the impelling members, relatively bodily displaced as a whole toward and away from each other. When the valve element presently to be described is to be moved in either direction between closed and open positions the sealing members 2 and 3 are moved apart. When the valve element has reached its desired position, either closed or open, the sealing members are moved together to seal against the valve element. The structure of the mechanism for relatively moving the sealing members does not constitute the invention of the present application, being claimed in my copending application Serial No. 230,331, filed June 7, 1951, now Patent No. 2,606,454.

The impelling members 5 are guided in their relative movements toward and away from each other by guide pins 13 and 14, the former being disposed at an elevation generally above the conduit and the latter being disposed at an elevation generally below the conduit. Each of the pins 13 and 14 may be fastened as by welding to one of the impelling members 5 so that upon relative movement of the impelling members toward or away from each other they are guided substantially parallel to the axis of the conduit and of the sealing members 2 and 3, that axis being designated by reference numeral 15.

The valve element is designated generally by reference numeral 16. It comprises an imperforate portion 17 adapted to be disposed across the conduit when the valve is in closed position and a perforate portion 18 adapted to be aligned with the conduit when the valve is in open position. When the valve is in closed position the sealing members 2 and 3 seal against the portion 17 of the valve element 16 as shown in the drawings while when the valve is in open position the sealing members 2 and 3 seal against the valve element 16 about the perforate portion 18 thereof so that flow of fluid through the conduit is permitted.

Figure 2:
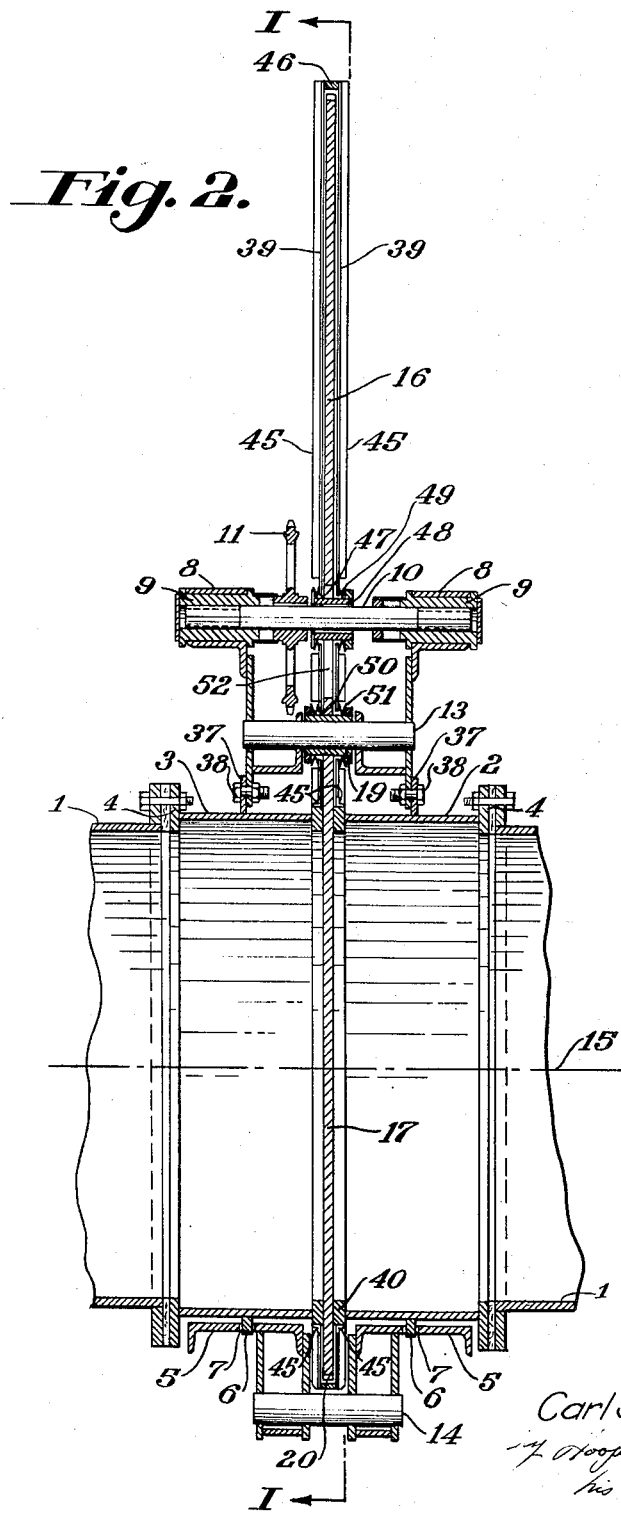
Figure 2 is an enlarged cross-sectional view of the valve shown in Figure 1, the cross-section being taken vertically through the axis of the conduit and being indicated by the line II—II of that figure.

Disposed about the pin 13 at its mid-portion is a sleeve 19 which is freely turnable thereon. The valve element 16 is carried by the sleeve 19 as shown in Figure 2 and may be welded or otherwise fastened about the sleeve. Thus the valve element 16 is rotatably carried by the pin 13. The valve element 16 has at its periphery a circular rack 20 with which meshes a pinion 21 keyed to a shaft 22 rotatably mounted in bearings 23 carried by the machine frame. In addition to being keyed to the shaft 22, the pinion 21 is also fastened to the shaft 22 against movement axially of the shaft by a screw 28 threaded through the hub 29 of the pinion 21. Also fixed to the shaft 22 is a chain wheel 24 over which is disposed a chain, not shown in the drawings, which hangs down to be operated from the floor. Pulling downwardly of one reach of the chain turns the valve element 16 in one direction about the axis of the pin 13 and pulling downwardly of the other reach of the chain turns the valve element 16 in the opposite direction about the axis of the pin 13. Thus the chain disposed about the chain wheel 24 is used for moving the valve element 16 between operative and inoperative positions when the sealing members 2 and 3 have first been separated.

Figure 4:
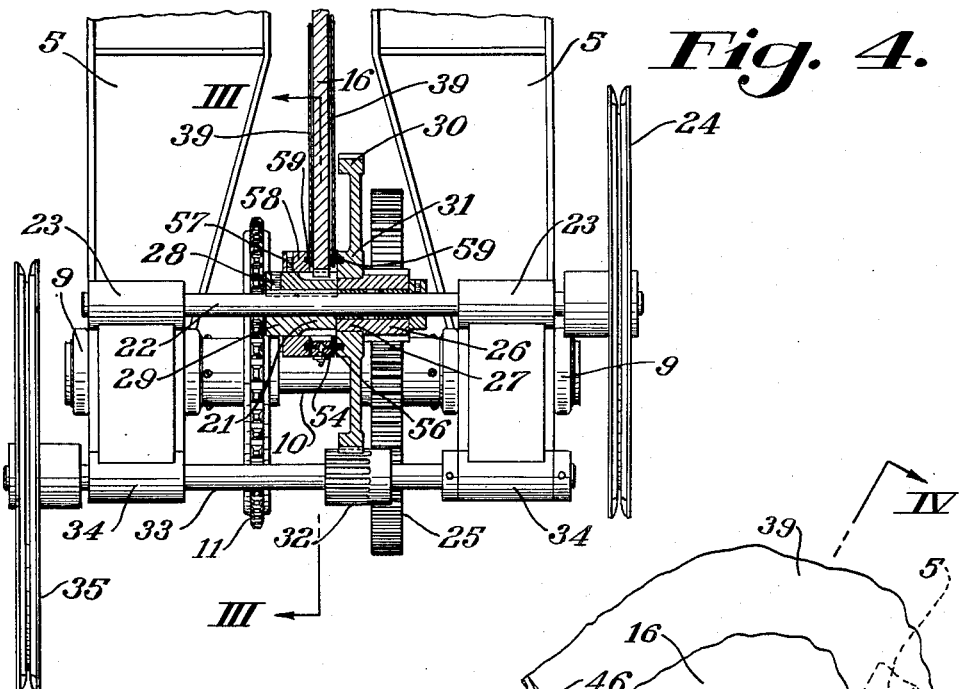
Figure 4 is a fragmentary cross-sectional view taken on the line IV—IV of Figure 3.
Figure 3:
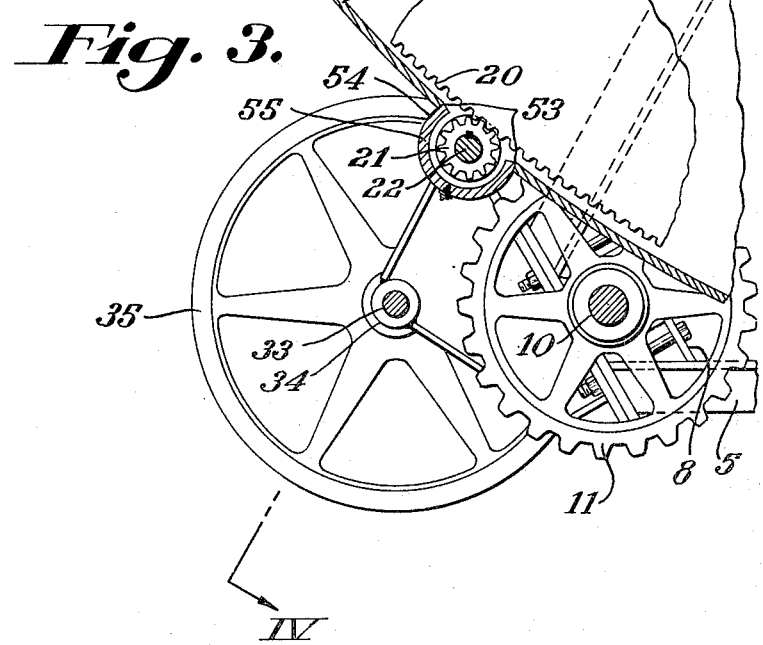
Figure 3 is an enlarged fragmentary cross-sectional view taken on the line III—III of Figure 4 of a portion of the valve mechanism.

Fastened to the lower left hand shaft 10, viewing Figure 1, is a gear 25 which meshes with a pinion 26 loose on the shaft 22. The pinion 26 has a hub 27 about which is disposed a gear 30 which may be shrunk onto the hub 27 or otherwise fastened thereto so as in effect to form an integral part of the pinion 26. The gear 30 itself has a hub 31 (see Figure 4). The gear 30 meshes with a pinion 32 fixed to a shaft 33 journaled in bearings 34 carried by the machine frame. Also fixed to the shaft 33 is a chain wheel 35 with which meshes a chain 36 which hangs down to be manually operated from the floor. Pulling downwardly of one reach of the chain 36 moves the impelling members 5 relatively toward each other and pulling downwardly of the other reach of the chain 36 moves the impelling members 5 relatively away from each other. Movement of the impelling members brings about a corresponding movement of the sealing members 2 and 3 and due to the connections between the impelling members and the sealing members as described above the sealing members are positively moved toward or away from each other, as the case may be, but any deflection occurring in the impelling members is not transmitted to the sealing members which are free to properly seat themselves against each other or against the valve plate, as the case may be, to effect a seal. As has been mentioned, the sealing members 2 and 3 are moved apart when the position of the valve element 16 is to be changed and are moved toward each other when the valve element has been moved to its new position to effect a seal either against the valve element or against each other, as the case may be.

In assembling each of the sealing members 2 and 3 with the corresponding impelling member 5 the impelling member is disposed generally about the sealing member with the lugs 6 offset angularly with respect to the slots 7 whereupon the sealing member and the impelling member are relatively turned to bring the lugs 6 into the slots 7. Each sealing member has a relatively thin lug 37 welded thereto and projecting upwardly therefrom, which lug 37 is bolted by a bolt 38 to a portion of the corresponding impelling member 5. The purpose of this connection is to maintain the sealing member and impelling member against inadvertent relative turning movement after they have been assembled. Also the connection transmits a portion of the load of the impelling member to the sealing member but without transmitting deflections of the impelling member to the sealing member. The lugs 37 may be so thin as to be readily flexible or the holes for the bolts 38 may be oversize to enable the connection to perform its function as above described without transmitting deflections from the impelling member to the sealing member.

I provide a casing for substantially segregating the inside of the conduit in the region of the valve from the outside. The casing comprises a body portion, a peripheral portion and an extension. The body portion of the casing consists of two generally circular plates each designated generally by reference numeral 39. Each of the plates 39 is made up of four pieces welded together. The pieces of each plate 39 are designated respectively 39a, 39b, 39c and 39d. The shapes of the pieces 39a, 39b, 39c and 39d are clearly shown in Figure 1. The pieces of each of the plates 39 are fitted together about the inner flange 40 of the corresponding sealing member 2 or 3, as the case may be, and welded to each other and to that flange. The pieces 39a and 39b of each of the plates 39 are welded to each other at 41. The pieces 39b and 39c of each of the plates 39 are welded to each other at 42. The pieces 39c and 39d of each of the plates 39 are welded to each other at 43. The pieces 39a and 39d of each of the plates 39 are welded to each other at 44. Each of the plates 39 is stiffened by ribs 45. After welding the pieces of each plate to each other and to the corresponding sealing member 2 or 3, as the case may be, the plate becomes in effect a unitary part of the sealing member, projecting radially outwardly from the flange 40 thereof.

The peripheral portion of the casing is shown at 46 and is disposed peripherally of the casing at and between the edges of the plates 39 and is welded in place between those edges.

Each of the casing plates 39 has a circular opening 47 through which the upper shaft 10 passes. The upper shaft 10 is turnable within a sleeve 48 to which the plates 39 are welded or otherwise sealed as shown at 49. Thus the casing is sealed about the upper shaft 10, which is the only one of the three shafts 10 which is disposed within the confines of the casing. The two lower shafts 10 are disposed outside the casing.

Each of the casing plates 39 also has a circular opening 50 within which is disposed the sleeve 19, the casing plates 39 being disposed at opposite sides of the valve element 16 and being sealed to the sleeve 19 by any suitable sealing structure as indicated at 51.

The valve element 16 has a slot 52 therein in which the upper shaft 10 and the sleeve 48 are disposed and permitting movement of the valve element 16 despite the fact that the upper shaft 10 intersects it.

The peripheral position 46 of the casing is interrupted at 53 to provide a slot permitting meshing of the teeth of the rack 20 and the teeth of the pinion 21. The casing has an extension designated generally by reference numeral 54 which includes a generally arcuate outside member 55 sealed to the periphery of the body of the casing and side members 56 forming in effect continuations of the respective plates 39.

Fastened to the hub 29 of the pinion 21 by a screw 57 is a hub 58. Each of the hubs 31 and 58 is sealed to the sides of the casing by an annular sealing member 59. Thus both turning of the valve element 16 and movement of the impelling members 5 and the sealing members 2 and 3 toward and away from each other are provided for while at the same time substantially segregating the conduit in the region of the valve from the outside.

The casing is flexible so as to bend slightly upon relative displacement of the sealing members 2 and 3. Such bending is provided for by the fact that the material of which the casing sides are made is relatively thin sheet material which will flex or deform sufficiently to permit the axial travel of the sealing members 2 and 3 which is necessary for functioning of the valve.

While I have shown and described a present preferred embodiment of the invention it is to be distinctly understood that the invention is not limited thereto but may be otherwise variously embodied within the scope of the following claims.

I claim:

1. A plate valve comprising a valve element movable transversely of a conduit between open and closed positions, sealing members at opposite sides of the valve element connected with the conduit and relatively bodily displaceable as a whole toward and away from each other and a casing enclosing the valve element, the casing being carried by the sealing members and sealed thereto and being effective for substantially segregating the inside of the conduit in the region of the valve from the outside.

2. A plate valve comprising a valve element movable transversely of a conduit between open and closed positions, sealing members at opposite sides of the valve element connected with the conduit and relatively bodily displaceable as a whole toward and away from each other and a casing enclosing the valve element, the casing being carried by the sealing members and sealed thereto, the casing being flexible so as to bend slightly upon relative displacement of the sealing members.

3. A plate valve comprising a valve element movable transversely of a conduit between open and closed positions, sealing members at opposite sides of the valve element connected with the conduit and relatively bodily displaceable as a whole toward and away from each other and a casing enclosing the valve element, the casing having opposed flexible portions each of which generally surrounds part of one of the sealing members and is sealed thereto and a peripheral portion sealing the opposed portions to each other.

References Cited in the file of this patent

UNITED STATES PATENTS

| Number | Name | Date |
|---|---|---|
| 1,674,255 | Morrison | June 19, 1928 |
| 1,842,056 | Westling | Jan. 19, 1932 |
| 2,079,896 | Brosius | May 11, 1937 |
| 2,125,253 | Bowling | July 26, 1938 |
| 2,229,165 | Bowling | Jan. 21, 1941 |